(12) United States Patent
Mathew et al.

(10) Patent No.: US 10,263,809 B2
(45) Date of Patent: Apr. 16, 2019

(54) SELECTING AN OPTIMAL NETWORK DEVICE FOR REPORTING FLOW TABLE MISSES UPON EXPIRY OF A FLOW IN A SOFTWARE DEFINED NETWORK

(71) Applicant: HEWLETT PACKARD ENTERPRISE DEVELOPMENT LP, Houston, TX (US)

(72) Inventors: Subin Cyriac Mathew, Bangalore (IN); Sugesh Chandran, Bangalore (IN); Celestian Kaniampady Sebastian, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 42 days.

(21) Appl. No.: 15/312,554

(22) PCT Filed: Aug. 25, 2014

(86) PCT No.: PCT/US2014/052534
§ 371 (c)(1),
(2) Date: Nov. 18, 2016

(87) PCT Pub. No.: WO2015/199743
PCT Pub. Date: Dec. 30, 2015

(65) Prior Publication Data
US 2017/0295035 A1    Oct. 12, 2017

(30) Foreign Application Priority Data

Jun. 25, 2014  (IN) .......................... 3087/CHE/2014

(51) Int. Cl.
*H04L 12/721* (2013.01)
*H04L 12/64* (2006.01)
(Continued)

(52) U.S. Cl.
CPC ...... *H04L 12/6418* (2013.01); *H04L 12/1863* (2013.01); *H04L 45/38* (2013.01); *H04L 45/54* (2013.01)

(58) Field of Classification Search
CPC ......... H04L 45/38; H04L 45/54; H04L 45/48; H04L 45/74; H04L 41/0893
See application file for complete search history.

(56) References Cited

U.S. PATENT DOCUMENTS 8,391,289 B1   3/2013   Yalagandula et al.
2011/0317559 A1   12/2011   Kern et al.
(Continued)

FOREIGN PATENT DOCUMENTS

WO   WO-2013/132395 A1   9/2013
WO   WO-2014/046875 A1   3/2014

OTHER PUBLICATIONS

Adam Zarek et al., "OpenFlow Timeouts Demystified," Apr. 18, 2012, pp. 1-34, University of Toronto, Available at: <eecg.toronto.edu/~lie/papers/zarek_mscthesis.pdf>.
(Continued)

*Primary Examiner* — Raj Jain
(74) *Attorney, Agent, or Firm* — McDermott Will & Emery

(57) ABSTRACT

Examples disclosed herein relate to selecting an optimal network device for reporting flow table misses upon expiry of a flow in a software defined network, comprising. An SDN enabled device is selected, from a plurality of software defined network (SDN) enabled devices, for reporting a flow table miss upon expiry of a flow to an SDN controller, based on a pre-defined factor.

16 Claims, 4 Drawing Sheets

(51) Int. Cl.
    *H04L 12/741*    (2013.01)
    *H04L 12/18*     (2006.01)

(56) References Cited

U.S. PATENT DOCUMENTS

| | | |
|---|---|---|
| 2013/0128746 A1 | 5/2013 | Yedavalli |
| 2013/0259043 A1 | 10/2013 | Yamashita |
| 2014/0075498 A1 | 3/2014 | Porras et al. |
| 2014/0098669 A1 | 4/2014 | Garg et al. |
| 2015/0009830 A1* | 1/2015 | Bisht .............. H04L 47/125 370/236 |
| 2015/0124815 A1* | 5/2015 | Beliveau .............. H04L 45/38 370/392 |
| 2016/0050117 A1* | 2/2016 | Voellmy .............. H04L 12/6418 370/392 |
| 2017/0295035 A1* | 10/2017 | Mathew .............. H04L 12/1863 |

OTHER PUBLICATIONS

Anders Nygren et al., "Opennow Switch Specification, Version 1.4.0 (Wire Protocol 0x05)," Oct. 14, 2013, pp. 1-205. Open Networking Foundation.
Andrew R. Curtis et al., "DevoFlow: Scaling Flow Management for High-Performance Networks," SIGCOMM'11, Aug. 15-19, 2011, Toronto, Ontario, Canada, pp. 1-12, ACM.
International Search Report and Written Opinion, International Application No. PCT/US2014/052534, dated Feb. 25, 2015, pp. 1-10, KIPO.

* cited by examiner

SELECTING AN OPTIMAL NETWORK DEVICE FOR REPORTING FLOW TABLE MISSES UPON EXPIRY OF A FLOW IN A SOFTWARE DEFINED NETWORK

BACKGROUND

Recent trends in networking include a new approach to routing architecture in which data and control planes have been decoupled. This new split-architecture framework that focuses on splitting of control plane from forwarding arid data plane is the basis of software defined networking (SDN). In a software defined network (SDN), the control plane is implemented in an SDN controller and the data plane is implemented in the networking infrastructure (e.g., switches and routers). Data forwarding on a network device is controlled through flow table entries populated by the SDN controller that manages the control plane for that network. A network device that receives packets on its interfaces looks up its flow table to check the actions that need to be taken on a received packet.

BRIEF DESCRIPTION OF THE DRAWINGS

For a better understanding of the solution, embodiments will now be described, purely by way of example, with reference to the accompanying drawings, in which.

DETAILED DESCRIPTION

Figure 1:
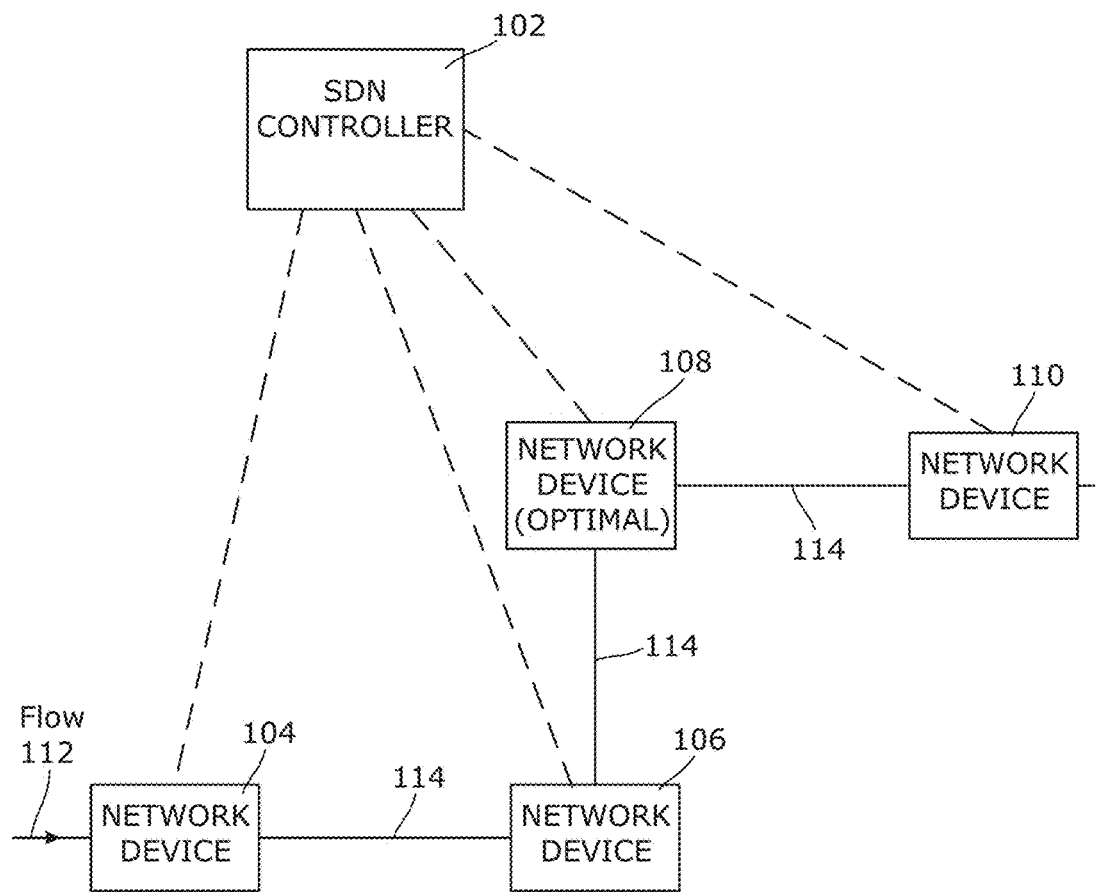
FIG. 1 is a diagram of an example network system to select an optimal network device for reporting flow table misses upon expiry of a flow in a software defined network.

Software defined networking (SDN) is an approach to networking in which control is decoupled from networking equipment and given to a device called a controller (or SDN controller). The controller may be aware of all the devices and their points of interconnection in a SDN network and performs various functions such as routing, policy implementation, etc. Each new or missed flow through the network is routed via the controller that decides the network path for a flow, and adds an entry for that flow in a flow table in each of the network devices along the path. A SDN enabled device consults a flow table(s) for forwarding packets in the data plane. Each forwarding rule (flow entry) includes an action that dictates how traffic that matches the rule is to be handled. A SDN controller may communicate with network devices via a standardized protocol (such as OpenFlow) or a proprietary API.

Apart from installing new flow rules, an SDN controller may be responsible for removing the flow rules as well. Towards this task, the controller may assign a timeout to each flow entry. When a timeout expires on an SDN enabled device (e.g., switches), the device may evict the rule from the flow table and, optionally, notify the controller regarding the removal. Often, when a new flow arrives at the controller for flow programming, the controller may not know the exact period of time during which the flow may remain active. In an instance, the controller may determine an expected duration of a flow session based on the flow signature, and heuristics from prior traffic patterns. Based on these, the controller may program a flow entry with a hard timeout. When a hard timeout expires the flow entry is evicted by the switch irrespective of whether or not packets are matching the flow entry. In other words, the flow entry is removed from the network device regardless of the presence of a matching flow.

It is useful to have a flow replacement mechanism to prevent a switch flow table from overflowing as the number of flows increases. However, an issue with having a flow replacement mechanism is that a switch may remove the flow entry when the hard timeout expires even if a session is still ongoing. In many cases, a session may last longer than what was expected by the controller due to network retransmission necessitated by network congestion, delays due to host application bottlenecks, etc. Needless to say such situation is not desirable since any succeeding packets of the same flow may hit a "flow table miss" (i.e., there is no flow table entry for the flow) and may need to be forwarded to the controller to make a forwarding decision. This may cause a number of issues. For example, it may unnecessarily burden the controller which may not only have to receive a flow table miss packet, decide its future network path, but may also need to program a new flow in all the network devices along a future data path so that subsequent packets of the flow may take the new path instead of coming to the controller.

Further, in a controller with multiple Network Interface Cards (NICs) servicing different portions of a software defined network, high load on some portions may cause some NICs to be overloaded while others may remain underutilized. In other words, the kernel network stack and multi-threaded controller application threads may not be efficiently utilized. Also, it has been observed that new flow misses are almost entirely clustered around access switches whereas flow misses on the upstream devices are due to flow timeouts. But currently a flow miss from upstream devices are processed in the same way as new flow miss even though the flow may already have been classified in a first-pass. Furthermore, some switches simply may not have the resources to process flow miss packets for reporting to a controller. When a large number of packets (especially in case of a high speed data transfer session, multimedia data streaming, etc.) come to the resource constrained switch control plane due to a flow miss, the switch may not be able to process all of them, resulting in packet drops of multiple flows. This may cause packet re-ordering, retransmission and latency issues. In addition, high flow miss rate may introduce thrashing of a flow table wherein the switch ends up adding and removing the same flow entries continuously. Further, since switches in a flow path are not at equal distance from the controller, it may cause increased latency to report flow miss and the corresponding flow programming.

To address these issues, the present disclosure describes various examples for selecting an optimal network device for reporting flow table misses on expiry of flow in a software defined network. In an example, an SDN enabled device is selected from a plurality of software defined network (SDN) enabled devices for reporting a flow table miss upon expiry of a flow to an SDN controller based on a pre-defined factor. Upon selection, the selected SDN device may act as a "reporting switch" for reporting a subsequent flow table miss of the flow to the SDN controller.

As used herein, the term "optimal" is not intended to mean that the selection is objectively the best or optimal, but rather that the selection was the result of the techniques described herein. Such a selection may be deemed subjectively optimal due to any number of criteria being met.

FIG. 1 is a diagram of an example network system 100 to select an optimal network device for reporting flow table misses on expiry of a flow in a software defined network. Network system 100 may include an SDN controller 102, and a plurality of network devices 104, 106, 108, and 110. Although only one SDN controller 102 and four network devices are shown in FIG. 1, other examples of this disclosure may include more than one SDN controller and more or less number of network devices. In an example, network system 100 may include one or more computer systems or an end user device(s) (not shown) that may be the source or destination of packet flows in network system 100. In an example, network system 100 may be based on software-defined networking (SDN) architecture.

SDN controller 102 may be any server, computing device, or the like. In an example, SDN controller 102 may be a computer application (machine-executable instructions). SDN controller 102 may define the data flow that occurs in network system 100. In other words, SDN controller 102 may determine how packets should flow through the network devices 104, 106, 108, and 110 of network system 100. SDN controller 102 may communicate with network devices 104, 106, 108, and 110 via a standardized protocol (example, OpenFlow) or a suitable API.

SDN controller 102 may maintain all network rules and provide appropriate instructions (such as forwarding instructions) to network devices 104, 106, 108, and 110. SDN controller 102 may centralize the network intelligence, while network maintains a distributed forwarding plane through network devices 104, 106, 108, and 110. In other words, SDN controller 102 may become aware of the network topology prior to computing forwarding paths in network system 100. SDN controller 102 then program rules on each network device (for example, 104, 106, 108, and 110) which may be used by a network device to forward packets to another device in the network 100. In an example, aforesaid programming rules may take the form of a flow entry in one or more flow tables in a network device (for example, 104, 106, 108, and 110). Each flow entry may be associated with an action (example, forward, redirect, drop, etc.) that describes what process may be followed with respect to a flow that corresponds to a flow entry. SDN controller 102 thus controls the way data packets are routed in network 100.

SDN controller 102 may communicate with network devices 104, 106, 108, and 110 over a computer network 112. Computer network 112 may be a wireless or wired network. Computer network 106 may include, for example, a Local Area Network (LAN), a Wireless Local Area Network (WAN), a Metropolitan Area Network (MAN), a Storage Area Network (SAN), a Campus Area Network (CAN), or the like. Further, computer network 112 may be a public network (for example, the Internet) or a private network (for example, an intranet).

Network devices 104, 106, 108, and 110 may include, by way of non-limiting examples, a network switch, a network router, a virtual switch, and a virtual router. In an example, at least one of the network devices 104, 106, 108, and 110 may be an SDN enabled device or an Open-Flow enabled device. In an example, network devices 104, 106, 108, and 110 are part of a network path assigned to a flow in network system 100.

Network devices 104, 106, 108, and 110 may include one or more flow tables (not shown). Each flow table in network devices 104, 106, 108, and 110 may contain a flow entry (or flow entries) 106. SDN controller 102 may add, update, and delete flow entries 106 in flow tables both reactively (in response to packets) and proactively. Network devices 104, 106, 108, and 110 may communicate with SDN controller 102 and the controller 102 may manage the device via a standardized protocol such as OpenFlow. For instance, one of the network devices 104, 106, 108, and 110 may forward the first packet of a flow to SDN controller 102, enabling the controller : 102 to decide whether the flow should be added to a flow table of a network device (for example, 104, 106, 108, and 110). Network devices 104, 106, 108, and 110 thus may accept directions from an SDN controller 102 to change values in a flow table.

A flow table matches an incoming packet to a particular flow and specifies the function that may be performed on the packet. If a flow entry 106 matching with a flow is found in a flow table, instructions associated with the specific flow entry may be executed. A packet matches a flow table entry 106 if the values in the packet match fields used for the lookup match those defined in the flow table entry 106. If no match is found in a flow table (such cases may be termed as "flow table misses"), the outcome may depend on configuration of the table-miss flow entry. For example, the packet may be forwarded to SDN controller 102. This has an advantage that the SDN controller may re-forward the packet after installing the flow entry in the network devices of a future path of the flow. In another implementation, a network device may drop the packet and choose to only send metadata about the packet to the SDN controller. The metadata may include sufficient information about the packet which may enable the SDN controller 102 to associate it with a flow entry which the controller may already have introduced in a network device.

Each flow entry 106 may consist of match fields, counters, and a set of instructions to apply to matching packets. In an example, each flow table entry 106 may include a number of components, for example, match fields, priority, counters, instructions, timeouts, and cookie.

A timeout component may define the maximum amount of time before a flow may be expired by a network device. In an example, the timeout period may represent a hard timeout period. The hard timeout period represents maximum amount of time before the flow entry is removed from the network device irrespective of whether or not packets are arriving at the flow entry in the network device. In another example, the time period may represent an inactivity timeout period. If no packets of a flow are observed before the expiry of the inactivity time period, the flow entry is evicted from the network device.

In an example, an SDN controller (for example, 102) may select an optimal network device from a plurality of network devices (for example, 104, 106, 108, and 110) present in a network system (for example, 100) for reporting a flow table miss for a flow to the SDN controller (for example, 102) based on a pre-defined factor. Upon selection, the selected SDN device may act as a "reporting device" for reporting a subsequent flow table miss for the flow to the SDN controller (for example, 102). In other words, the reporting device may be used to report any subsequent flow miss that may occur due to a timeout for a flow after the initial flow setup.

An SDN controller (for example, 102) may use various factors to identify an optimal network device in the data path of a flow to act as the reporting device for that flow. These factors may depend on the SDN controller (or controllers) (for example, 102) present in the network system 100, network devices (for example, 104, 106, 108, and 110) present in the network system, and the network system 100.

Some non-limiting examples of pre-defined factors that may depend on an SDN controller (for example, 102) may include a packet interrupt servicing load at the SDN controller (for instance, in case of a controller with multiple network interfaces (such as NICs), the load may vary across various network interfaces), and an application load at the SDN controller (for instance, in case of multiple controllers in a network system, application load may vary across various controllers or in a multithreaded controller application, the load may vary across the threads).

A non-limiting example of a pre-defined factor associated with an SDN enabled device (for example, 104, 106, 108, and 110) may include the processing capability of the SDN enabled device to process a flow miss packet for reporting to the SDN controller (for example, 102). In other words, the difference in capability of processing of flow miss packets to be reported to an SDN controller at each of the network devices present in the data path of a flow may be considered a factor for selecting a reporting switch.

Some non-limiting examples of pre-defined factors that may depend on the network system may include the distance between an SDN controller (for example, 102) and each of the plurality of network devices (for example, 104, 106, 108, and 110). This factor may also include parameters such as management network bandwidth, and network latency between an SDN controller (for example, 102) and each network device in a network system. The utilization rate of a control channel between an SDN controller (for example, 102) and each network device in a network system (for example, 100) may also be considered a factor in selecting a network switch. Another factor may include a network infrastructure induced limitation. For instance, a network system may partially be converted into an SDN based network by using OpenFlow-hybrid switches that may support both OpenFlow as well as legacy protocols. In such case, a fork-lift upgrade of the network system may not be possible, and the existing infrastructure may need to be optimally utilized.

In an example, a flow policy or a priority assigned to a flow may act as a factor for selecting an optimal network device for reporting flow table misses in a network. In such case, an SDN controller (for example, 102) may assign different reporting switches to each flow while classifying the flow signature based on a pre-configured policy or priority.

An SDN controller (for example, 102) may select an SDN enabled device (for example, 104, 106, 108, or 110), for reporting a flow table miss for an existing flow to the SDN controller (for example, 102), based on a set or matrix of parameters or factors. In an instance, each factor in a given set or matrix may be assigned a weightage, and for each network device present in the data path under consideration a "cost" of reporting a flow miss may be calculated. The network device that offers the lowest cost for reporting a flow miss entry may be selected as the optimal device ("reporting device") for reporting a flow table miss to the SDN controller (for example, 102).

In an example, the cost of reporting a flow miss for each network device 'n' for a flow 'f' and for identifying a reporting device may be determined as follows:

```
If the controller identified path for a particular flow is N1 → N2 → N3 ............... Nn,
n ∈ {N1, N2, N3, N4, ............. Nn},
cost (n,f) = Cost of reporting flow miss via network device Switch 'n' for the flow 'f'.
nodeList= N1,N2, N3, .......... Nn
Reporter_node = N1
for each node 'n' in nodeList
    if(cost( n, f) < cost(Reporter_node, f)
        Reporter_node = n
    end if
end for
```

Once a reporting device has been identified, in order to route a further flow miss to the controller (example 102) via this device, the controller may explicitly send a delete message to this device when the timeout expires or hard timeouts may be programmed in all network devices in the path such that the reporting device times out first. The timeouts for other network devices may be increased by an amount Δ, which may take into account the time needed to update the flow entries if the controller decides to extend the flow.

In an example, timeouts may be assigned to network devices in a path as follows:

```
HARD_TIMEOUT_f: The hard timeout for a particular flow 'f' assigned by a controller.
INACTIVITY_TIMEOUT_f: The inactivity timeout for a particular flow 'f' assigned by a controller.
T = {t_1, t_2, t_3, t_4, t_5 ....................., t_n}, where t_n is the timeout value of switch 'n' for the flow 'f'.
Δ = {Δ_1, Δ_2, Δ_3, Δ_4, Δ_5, ....................... Δ_n} ,where Δ_n is the increment over the HARD_TIMEOUT_f for switch 'n' for the flow 'f'. Note that upper bound of Δ_n is INACTIVITY_TIMEOUT_f
for each node 'n' in nodeList
    if(n == Reporter_node))
        t_n = HARD_TIMEOUT_f
    else
        t_n = HARD_TIMEOUT_f + Δ_n
    end if
end for
```

By way of an example, FIG. 1 shows selection of an optimal network device ("reporting device") 108 from a plurality of network devices 104, 106, 108, and 110, for reporting a flow table miss upon expiry of a flow to an SDN controller 102, based on a pre-defined factor. In an example, when a new flow 112 reaches the first network device 104, it may result in a flow table miss, and the packet may be sent to the controller. In case the SDN controller decides to continue the flow, it may compute a data path (104→106→108→110) for the flow, and identify an optimal network device 108 based on a pre-defined factor (or factors), as described above. The SDN controller may program flow table entries in each of the network devices (including the identified optimal device) that are present in the data path 114 in such a manner that the timeout period associated with the identified device 108 is first to timeout. Since the identified device 108 times out first, any subsequent packets may get redirected to the controller from the reporting device. Upon receipt of a packet from the reporting device, if the SDN controller decides to allow a flow to continue, it may reprogram the flow entry in the reporting device and update the flow entries in all other network device switches in the data path prior to their expiry. In an example, each time an SDN controller may reprogram a data path; it may select a reporting device based on one or more parameters as described above. Thus, the controller may control channeling of an unknown flow reporting via an optimal network device.

Figure 2:
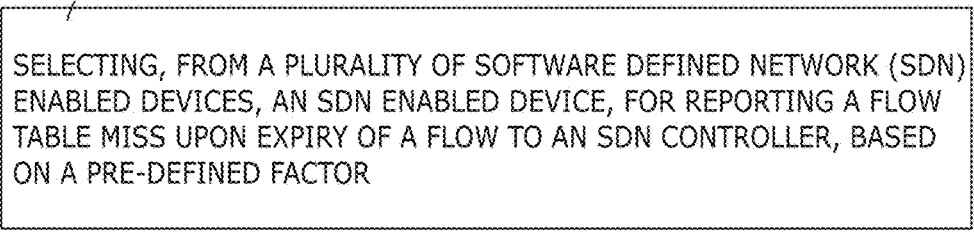
FIG. 2 is a flow chart of an example method for selecting an optimal network device for reporting flow table misses upon expiry of a flow in a software defined network.

FIG. 2 is a flow chart of an example method 200 for selecting an optimal network device for reporting flow table misses upon expiry of a flow in a software defined network. The method 200, which is described below, may be executed on a computing device such as SDN controller 102 of FIG. 1. However, other suitable computing devices may execute method 200 as well. In particular, method 200 may execute, at least partially, in one or more network devices (for example, 104, 106, 108, and 110). At block 202, an SDN controller (for example, 102) may select, from a plurality of software defined network (SDN) enabled devices (for example, 104, 106, 108, and : 110) in a software defined network, an SDN enabled device for reporting a flow table miss upon expiry of a flow to the SDN controller, based on a pre-defined factor (or factors). The pre-defined factor(s) may include one or more factors as described above. The pre--defined factor may depend on the SDN controller, the SDN enabled devices in the network, and/or the software defined network itself. In an example, the plurality of SDN enabled devices are present on a common network path of a flow, and the SDN controller selects an SDN enabled device for reporting a flow table miss for the flow from one of the SDN enabled devices.

Figure 3:
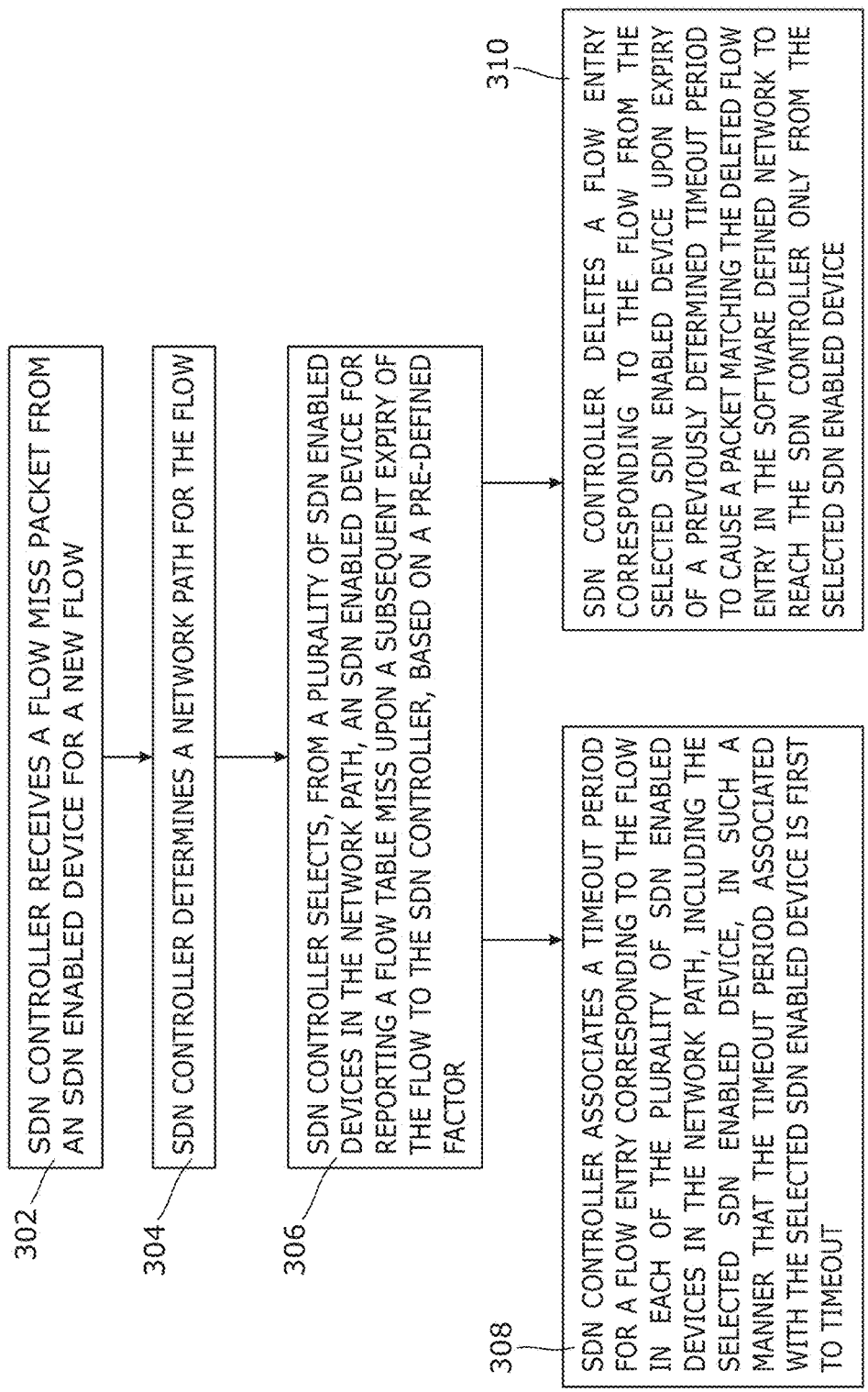
FIG. 3 is a flow chart of an example method for selecting an optimal network device for reporting flow table misses upon expiry of a flow in a software defined network.

FIG. 3 is a flow chart of an example method 300 for selecting an optimal network device for reporting flow table misses upon expiry of a flow in a software defined network. The method 300, which is described below, may be executed on a computing device such as SDN controller 102 of FIG. 1. However, other suitable computing devices may execute method 300 as well. In particular, method 300 may execute, at least partially, in one or more network devices (for example, 104, 106, 108, and 110). At block 302, an SDN controller : 102 may receive a flow miss packet from an SDN enabled device (for example, 104). A flow miss packet may be generated when a new flow reaches the SDN enabled device (for example, 104). Since there is no flow entry in the SDN enabled device (for example, 104) for a new flow, it results in a flow miss, and a packet from the new flow may be forwarded to the SDN controller 102. At block 304, the SDN controller (for example, 102) may determine a network path for said flow and add flow table entries in each SDN enabled device in the network path. At block 306, SDN controller may select an SDN enabled device in the network path for reporting a flow table miss upon a subsequent expiry of the flow to the SDN controller, based on a pre-defined factor (or factors). Method 300 may then proceed to block 308 or 310. At block 308, the SDN controller may associate a timeout period for a flow entry corresponding to the flow in each of the plurality of SDN enabled devices in the network path of the flow, including the selected SDN enabled device, in such a manner that the timeout period associated with the selected SDN enabled device is first to timeout. At block 310, SDN controller may delete a flow entry corresponding to the flow from the selected SDN enabled device when the initially calculated timeout period expires to cause a packet matching the deleted flow entry in the software defined network to reach the SDN controller only from the selected SDN enabled device.

Figure 4:
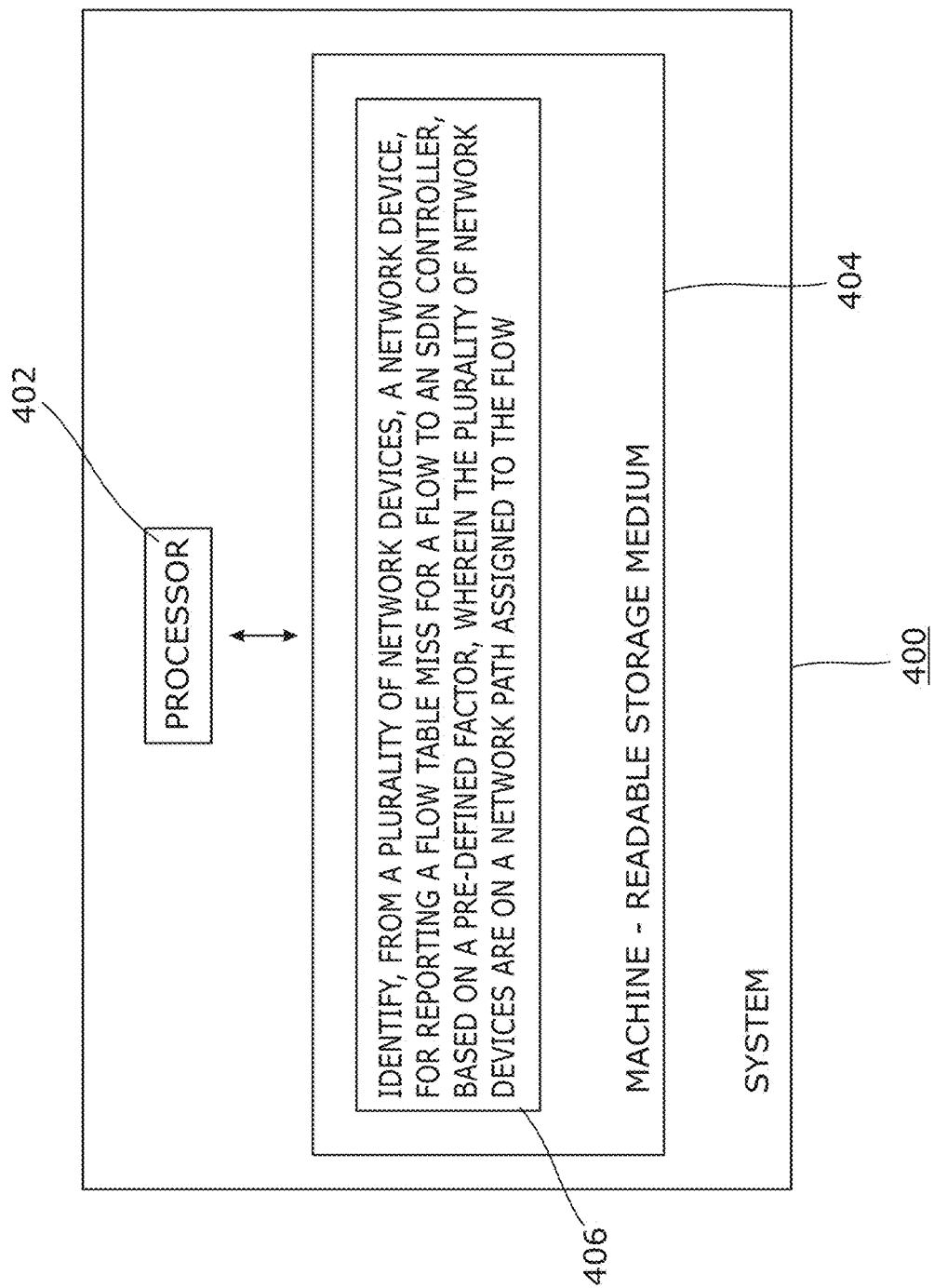
FIG. 4 is a diagram of an example system to select an optimal network device for reporting flow table misses upon expiry of a flow in a software defined network.

FIG. 4 is a diagram of an example system 400 to select an optimal network device for reporting flow table misses upon expiry of a flow in a software defined network. System 400 includes a processor 402 and a machine-readable storage medium 404 communicatively coupled through a system bus. In an example, system 400 may be analogous to SDN controller 102 of FIG. 1. Processor 402 may be any type of Central Processing Unit (CPU), microprocessor, or processing logic that interprets and executes machine-readable instructions stored in machine-readable storage medium 404. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 404 may store instructions 406. In an example, instructions 406 may be executed by processor 402 to identify, from a plurality of network devices, a network device, for reporting a flow table miss for a flow to an SDN controller, based on a pre-defined factor, wherein the plurality of network devices are on a network path assigned to the flow. In an example, machine-readable storage medium 404 may store further instructions to query only the identified network device for a flow parameter to decide regarding continuation or removal of the flow from the software defined network. The storage medium 404 may also store instructions to associate a hard timeout period for a flow entry corresponding to the flow in each of the plurality of network devices, including the identified network device, in such a manner that the hard timeout period associated with the identified network device is first to timeout. The storage medium 404 may further include instructions to report the flow table miss for the flow from the identified network device to the SDN controller.

For the purpose of simplicity of explanation, the example methods of FIGS. 2 and 3 are shown as executing serially, however it is to be understood and appreciated that the present and other examples are not limited by the illustrated order. The example systems of FIGS. 1 and 4, and methods of FIGS. 2 and 3 may be implemented in the form of a computer program product including computer-executable instructions, such as program code, which may be run on any suitable computing device in conjunction with a suitable operating system (for example, Microsoft Windows, Linux, UNIX, and the like). Embodiments within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method for selecting an optimal network device for reporting a flow table miss upon expiry of a flow in a software defined network (SDN), comprising:
   determining a pre-defined factor indicative of a cost for reporting the flow table miss to an SDN controller from each of a plurality of SDN enabled devices, the pre-defined factor comprising an SDN controller condition, an SDN enabled device condition, and a network system condition; and
   selecting, by the SDN controller, an SDN enabled device for reporting a flow table miss upon expiry of a flow to the SDN controller, based on the pre-defined factor.

2. The method of claim 1, further comprising associating a timeout period for a flow entry corresponding to the flow in each of the plurality of SDN enabled devices, including the selected SDN enabled device, in such a manner that the timeout period associated with the selected SDN enabled device is first to timeout.

3. The method of claim 1, further comprising deleting a flow entry corresponding to the flow from the selected SDN enabled device upon expiry of a previously determined timeout period to cause a packet matching the flow entry in the software defined network to reach the SDN controller only from the selected SDN enabled device.

4. The method of claim 1, wherein the pre-defined factor is associated with one of the SDN controller, the plurality of SDN enabled devices, and the software defined network.

5. The method of claim 4, wherein the pre-defined factor associated with the SDN controller is one of a packet interrupt servicing load at the SDN controller, and an application load at the SDN controller in the software defined network.

6. The method of claim 4, wherein the pre-defined factor associated with the SDN enabled device includes a processing capability of the SDN enabled device to process a flow miss packet for reporting to the SDN controller.

7. The method of claim 4, wherein the pre-defined factor associated with the software defined network 1 s one of a distance between the SDN controller and each of the plurality of SDN enabled devices, a utilization rate of a respective control channel between the SDN controller and each of the plurality of SDN enabled devices, and a network infrastructure based factor.

8. The method of claim 1, further comprising configuring the SDN enabled device to report a subsequent flow table miss of the flow to the SDN controller.

9. A system to select an optimal network switch for reporting flow table misses upon expiry of a flow in a software defined network, comprising:
   a plurality of network switches; and
   an SDN controller to select, from the plurality of network switches, a network switch, for reporting a flow table miss for an existing flow to the SDN controller, based on a pre-defined factor indicative of a cost for reporting the flow table miss to the SDN controller, wherein to determine the pre-defined factor the SDN controller is configured to:
      determine an SDN controller condition, an SDN enabled device condition, and a network system condition, and
      select a network switch for reporting a flow table miss upon expiry of a flow to the SDN controller, based on the pre-defined factor.

10. The system of claim 9, wherein the pre-defined factor is associated with a weightage.

11. The system of claim 9, wherein the pre-defined factor is a pre computed parameter or a run-time parameter.

12. A non-transitory machine-readable storage medium comprising instructions for selecting an optimal network device for reporting a flow table miss upon expiry of a flow in a software defined network (SDN), wherein the instructions are executable by a processor to:
   determine a pre-defined factor indicative of a cost for reporting the flow table miss to an SDN controller from each of a plurality of network devices, the pre-defined factor comprising an SDN controller condition, a network device condition, and a network system condition; and
   identify, by the SDN controller and from a plurality of network devices, a network device, for reporting a flow table miss for a flow to the SDN controller, based on a pre-defined factor, wherein the plurality of network devices are on a network path assigned to the flow.

13. The non-transitory machine-readable storage medium of claim 12, wherein the pre-defined factor includes a priority associated with the flow in the software defined network.

14. The non-transitory machine-readable storage medium of claim 12, further comprising instructions to query only the network device for a flow parameter to decide regarding continuation or removal of the flow from the software defined network.

15. The non-transitory machine-readable storage medium of claim 12, further comprising instructions to associate a hard timeout period for a flow entry corresponding to a packet flow through each of the plurality of network devices, including the network device, in such a manner that the hard timeout period associated with the network device is first to timeout.

16. The non-transitory machine-readable storage medium of claim 12, further comprising instructions to configure the network device to report the flow table miss for the flow from the network device to the SDN controller.

* * * * *